(12) United States Patent
Jacobson et al.

(10) Patent No.: US 7,420,549 B2
(45) Date of Patent: Sep. 2, 2008

(54) ELECTRO-WETTING DISPLAYS

(75) Inventors: Joseph M. Jacobson, Newton Centre, MA (US); Thomas H. Whitesides, Somerville, MA (US); Michael D. McCreary, Acton, MA (US); Richard J. Paolini, Jr., Arlington, MA (US)

(73) Assignee: E Ink Corporation, Cambridge, MA (US)

( * ) Notice: Subject to any disclaimer, the term of this patent is extended or adjusted under 35 U.S.C. 154(b) by 628 days.

(21) Appl. No.: 10/711,802

(22) Filed: Oct. 6, 2004

(65) Prior Publication Data

US 2005/0151709 A1 Jul. 14, 2005

Related U.S. Application Data

(60) Provisional application No. 60/481,482, filed on Oct. 8, 2003.

(51) Int. Cl.
G09G 5/00 (2006.01)
(52) U.S. Cl. ............... 345/204; 345/3.1; 345/4; 345/1.1; 345/7
(58) Field of Classification Search ........... 345/87–100, 345/204, 1.1, 3.1, 4, 7, 76, 169, 156, 176, 345/30, 75.2; 430/322; 359/296, 630; 204/600
See application file for complete search history.

(56) References Cited

U.S. PATENT DOCUMENTS

| | | | |
|---|---|---|---|
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 3,909,116 A | 9/1975 | Kohashi | |
| 4,418,346 A | 11/1983 | Batchelder | |
| 4,569,575 A | 2/1986 | Le Pesant et al. | |
| 4,838,660 A | 6/1989 | Fergason | |

(Continued)

FOREIGN PATENT DOCUMENTS

EP 1 145 072 B1 5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

Primary Examiner—Prabodh Dharia
(74) Attorney, Agent, or Firm—David J. Cole

(57) ABSTRACT

The performance of electro-wetting displays can be improved by: (a) providing a concealment member (112) which conceals the moving fluid (108) when that fluid (108) is confined to a small area; (b) using the moving fluid to cover one or more sections of a filter or reflector having differently-colored sections; (c) moving the moving fluid between the rear surface and a side surface of a microcell; (d) using as a substrate for a moving fluid a substrate resistant to wetting by the fluid but pierced by multiple conductive vias capped with a material wetted by the fluid; and (e) coloring the moving fluid with pigments or nanoparticles.

25 Claims, 4 Drawing Sheets

U.S. PATENT DOCUMENTS

| | | |
|---|---|---|
| 5,659,330 A | 8/1997 | Sheridon |
| 5,731,792 A | 3/1998 | Sheridon |
| 5,745,094 A | 4/1998 | Gordon, II et al. |
| 5,757,345 A | 5/1998 | Sheridon |
| 5,760,761 A | 6/1998 | Sheridon |
| 5,777,782 A | 7/1998 | Sheridon |
| 5,808,593 A | 9/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,956,005 A | 9/1999 | Sheridon |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,106,685 A * | 8/2000 | McBride et al. ............. 204/600 |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,449,081 B1 | 9/2002 | Onuki et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,603,444 B1 | 8/2003 | Kawanami et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,906,851 B2 | 6/2005 | Yuasa |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2002/0185378 A1 | 12/2002 | Honeyman et al. |
| 2003/0011560 A1 | 1/2003 | Albert et al. |
| 2003/0102858 A1 | 6/2003 | Jacobson et al. |
| 2003/0132908 A1 | 7/2003 | Herb et al. |
| 2003/0137521 A1 | 7/2003 | Zehner et al. |
| 2003/0151702 A1 | 8/2003 | Morrison et al. |
| 2003/0222315 A1 | 12/2003 | Amundson et al. |
| 2004/0014265 A1 | 1/2004 | Kazlas et al. |
| 2004/0027327 A1 | 2/2004 | LeCain et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0000813 A1 | 1/2005 | Pullen et al. |
| 2005/0001812 A1 | 1/2005 | Amundson et al. |
| 2005/0007336 A1 | 1/2005 | Albert et al. |
| 2005/0007653 A1 | 1/2005 | Honeyman et al. |

| | | | |
|---|---|---|---|
| 2005/0012980 | A1 | 1/2005 | Wilcox et al. |
| 2005/0017944 | A1 | 1/2005 | Albert |
| 2005/0018273 | A1 | 1/2005 | Honeyman et al. |
| 2005/0024353 | A1 | 2/2005 | Amundson et al. |
| 2005/0035941 | A1 | 2/2005 | Albert et al. |
| 2005/0041004 | A1 | 2/2005 | Gates et al. |
| 2005/0062714 | A1 | 3/2005 | Zehner et al. |
| 2005/0067656 | A1 | 3/2005 | Denis et al. |
| 2005/0099672 | A1 | 5/2005 | Jacobson et al. |
| 2005/0104804 | A1 | 5/2005 | Feenstra et al. |
| 2005/0122563 | A1 | 6/2005 | Honeyman et al. |
| 2007/0035808 | A1* | 2/2007 | Amundson et al. ......... 359/296 |
| 2007/0153361 | A1* | 7/2007 | Danner et al. ............... 359/296 |
| 2008/0057252 | A1* | 3/2008 | Danner et al. .............. 428/41.8 |
| 2008/0085477 | A1* | 4/2008 | Verhaverbeke et al. ...... 430/322 |

FOREIGN PATENT DOCUMENTS

| | | |
|---|---|---|
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 03/107315 | 12/2003 |
| WO | WO 2004/027489 | 4/2004 |
| WO | WO 2004/068208 | 8/2004 |

OTHER PUBLICATIONS

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

McNaught, A.D. and Wilkinson, A., "Lippman's Equation" in IUPAC Compendium of Chemical Terminology, 2nd edition, Blackwell Science, 1997.

Moon, H., et al., "Low Voltage Electrowetting-on-Dielectric", Journal of Applied Physics, Oct. 1, 2002, vol. 92, No. 7 (2002).

O'Regan, B. et al., "A Low Cost, High-efficiency Solar Cell Based on Dye-sensitized colloidal $TiO_2$ Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Sheridon, N.K., "Electrocapillary Imaging Devises for Display and Data Storage", Xerox Disclosure Journal, vol. 4, No. 3, pp. 385-386 (1979).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-WETTING DISPLAYS

BACKGROUND OF INVENTION

This invention relates to electro-wetting displays.

It has been known for more than a century that the interfacial tension between two immiscible media can be controlled by applying an electric potential across these media; see, for example, Lippmann, M. G., Ann. Chim. Phys., 5, 494 (1875). It has also long been known that the mathematical relationship between the applied electric potential (V) and the resulting surface tension ($\gamma$) can be expressed in Lippmann's Equation:

$$\gamma = \gamma_0 - 0.5 \, cV^2$$

where $\gamma_0$ is the surface tension of the solid-liquid interface at the potential zero charge (i.e., when there is no charge at the surface of the solid), and c is the capacitance per unit area, assuming that the charge layer can be modeled as a symmetric Helmholtz capacitor. So-called electro-osmotic and electro-capillary displays have also been developed; all these types of displays rely upon the change in wetting characteristics of a liquid in the presence of an electric field. See, for example, Sheridon, N. K., "Electrocapillary Imaging Devices for Display and Data Storage", Xerox Disclosure Journal 1979, 4, 385-386; and U.S. Pat. Nos. 5,956,005; 5,808,593; 5,757,345; 5,731,792; 5,659,330; 4,569,575; 6,603,444; and 6,449,081. A variety of displays using this principle have also been developed by Richard B. Fair and his co-workers at Duke University; see, for example, http://www.e.duke.edu/Research/microfluidics.

More recently, it has been discovered that a thin dielectric layer between the electrode and the liquid in an electro-wetting apparatus (thereby forming a so-called "electro-wetting on dielectric" apparatus) can emulate the electric double layer present in conventional electro-wetting apparatus. The dielectric layer can block electron transfer while sustaining the high electric field at the interface that results in charge redistribution when a potential is applied. Using a hydrophobic dielectric and an aqueous liquid provides a large initial contact angle, and thus room for a large change in contact angle upon electro-wetting. Furthermore, by employing a dielectric layer between the liquid and electrode, virtually any kind of liquid can be used, regardless of the polarization of the interface; see Moon, H., et al., "Low voltage electrowetting-on-dielectric", J. Appl. Phys, 2002, 92, 4080.

Researchers at Philips Research Laboratories, Eindhoven, the Netherlands, have described an electro-wetting display which is stated to be capable of video rate applications; see Nature, 425, 383 (2003) and International Applications WO 2004/068208; WO 2004/027489; and WO 03/071346. This display is of the electro-wetting on dielectric type and uses a cell having at its base a transparent electrode disposed over a white substrate. The electrode is covered by a hydrophobic dielectric layer. The cell further contains a colored (dyed) oil and water. When no voltage is applied, the colored oil wets the hydrophobic dielectric, so that the color seen is that of the oil. However, when a voltage is applied between the transparent electrode and a second electrode in contact with the water, the oil moves to a small portion of the pixel, so that in the major part of the pixel shows the white color of the substrate. An CMYK color scheme can be realized by dividing a pixel into three sub-pixels, the sub-pixels each having a white substrate, but with each sub-pixel having two oil layers of differing colors, for example cyan and magenta.

This type of display has a number of problems. The display is not bistable, since the confinement of the oil to the small portion of the pixel only lasts as long as the field is applied. While this is not a serious disadvantage when the display is used continuously to display video, there are applications where a user may wish to pause a video and examine an individual frame and, especially in portable devices, it would be advantageous if the display could be made bistable so that such examination of individual frames could be done without continuous power drain on a battery. The visibility of the oil in a small portion of the pixel reduces the contrast ratio of the display. The use of a dye dissolved in the oil may give rise to long term problems since most dyes in solution are adversely affected by long term exposure to radiation, which typically causes fading of the dye. This may be a particular problem in a display which relies upon the use of differently-colored oils, which are unlikely to fade at the same rate, so that the colors displayed may drift with time.

The present invention relates to various improvements in electro-wetting displays which can reduce or eliminate the aforementioned problems.

SUMMARY OF THE INVENTION

In one aspect, this invention provides a display comprising:
a substrate;
a first fluid disposed adjacent the substrate, the first fluid absorbing at least one wavelength of light;
a light-transmissive second fluid immiscible with the first fluid;
at least one electrode for applying an electric field to the first fluid; and
a concealment member spaced from the substrate and formed from a substantially opaque material,
such that, in the absence of an electric field, the first fluid covers a first area of the substrate, but that upon application of an electric field to the first fluid by the at least one electrode, the first fluid moves to a second area smaller than the first area and substantially confined between the concealment member and the substrate, so that the concealment member substantially conceals the first fluid from an observer viewing the display from the opposed side of the concealment member from the substrate.

The term "light-transmissive" is used herein to mean that the second fluid must transmit sufficient light to enable an observer, viewing the movement of the first fluid through the second fluid, to see this movement. (In the case of displays intended for machine reading at non-optical wavelengths, the term "light-transmissive" must of course be understood to mean transmissive of the wavelength(s) of electromagnetic radiation at which the display is read, and other terms used below referring to light should be construed accordingly.) Typically, the light-transmissive second fluid will be transparent, but we do not exclude the possibility that some color might be present in the second fluid to adjust the colors displayed. For example, many people prefer a "white" with a slightly blue hue over a strictly neutral white, so that, for example, in a display of the type described below with reference to FIGS. 1 and 2, in which the color change is from white to black, it may be advantageous to impart a slight blue color to render the white state slightly blue-white.

For convenience, this display may hereinafter be called the "concealment member display" of the present invention. In such a display, the substrate may comprise a dielectric surface adjacent the first fluid, and/or may comprise a colored or reflective layer. In one preferred form of such a display, the substrate has a substantially planar surface and the concealment member includes a substantially planar section extending substantially parallel to, but spaced from, the substantially planar surface of the substrate.

In another aspect, this invention provides a display comprising:

a substrate having at least first and second portions having first and second optical characteristics differing from one another;

a first fluid, the first fluid absorbing at least one wavelength of light and having a third optical characteristic differing from at least one of the first and second optical characteristics;

a light-transmissive second fluid immiscible with the first fluid; and a first electrode adjacent the first portion of the substrate and a second electrode adjacent the second portion of the substrate, such that by controlling the potentials applied to the first and second electrodes, the first fluid can be made to assume a first position, wherein the first fluid substantially covers the second portion of the substrate, leaving the first portion uncovered, and a second position, wherein the first fluid substantially covers the first portion of the substrate, leaving the second portion uncovered.

For convenience, this display may hereinafter be called the "color shifting display" of the present invention. In such a display, the first fluid may be capable of assuming a third position in which it covers both the first and second portions of the display.

In a color shifting display, the substrate may have more than two portions of differing colors. For example, the substrate may have a third portion having an optical characteristic differing from the first, second and third optical characteristics, and the display may further comprise a third electrode adjacent the third portion of the substrate, such that by controlling the potentials applied to the first, second and third electrodes, the first fluid can be made to assume a third position, wherein the first fluid substantially covers at least one of the first and second portions of the substrate, leaving the third portion uncovered. For example, the first, second and third portions of the substrate may be red, green and blue, or yellow, cyan and magenta in any arrangement. Further, the substrate may have a fourth portion having an optical characteristic differing from the first, second and third optical characteristics and from the optical characteristic of the third portion of the substrate, and the display may further comprise a fourth electrode adjacent the fourth portion of the substrate, such that by controlling the potentials applied to the first, second, third and fourth electrodes, the first fluid can be made to assume a fourth position, wherein the first fluid substantially covers at least one of the first, second and third portions of the substrate, leaving the fourth portion uncovered. For example, the first, second, third and fourth portions of the substrate may be red, green, blue and black, or yellow, cyan, magenta and black, in any arrangement.

In a color shifting display of the invention typically the first and second (and third and fourth, if present) portions of the substrate will be coplanar. These portions may assume various geometric forms. For example, these portions may have substantially the form of equilateral triangles. Alternatively, the first and second portions may have substantially the form of circles, the substantially circular first and second portions being connected by a neck section having a width smaller than the diameter of each substantially circular portion. An electrode may be disposed on or adjacent this neck section.

In another aspect, this invention provides a display comprising:

a first substrate through which an observer can view the display, a second substrate spaced from the first substrate and at least one sidewall extending between the first and second substrates, the first and second substrates and the sidewall together defining a chamber having a first substrate surface, a second substrate surface and at least one sidewall surface;

a first fluid disposed within the chamber, the first fluid absorbing at least one wavelength of light;

a light-transmissive second fluid immiscible with the first fluid and disposed within the chamber;

a first electrode disposed adjacent the second substrate surface of the chamber;

a second electrode disposed adjacent a sidewall surface of the chamber; and a third electrode extending into the chamber and in electrical contact with the second fluid, such that, by controlling the potentials applied to the first, second and third electrodes, the first fluid can be made to assume a first position, wherein the first fluid lies adjacent the second substrate surface of the chamber, and a second position, wherein the first fluid lies adjacent a sidewall surface of the chamber.

For convenience, this display may hereinafter be called the "microcell display" of the present invention. In such a display, the substrate may comprise a dielectric surface adjacent the first fluid, and/or may comprise a colored or reflective layer. The display may further comprise an insulator block disposed adjacent the junction between the second substrate surface and a sidewall surface of the chamber, with the third electrode passing through the insulator block.

In another aspect, this invention provides a display comprising:

a fluid;

a substrate having an exposed surface resistant to wetting by the fluid;

at least three conductive vias extending through the substrate and terminating adjacent the exposed surface thereof; and cap members covering the ends of the conductive vias adjacent the exposed surface, the cap members being formed of a material wetted by the fluid.

For convenience, this display may hereinafter be called the "conductive via display" of the present invention. In such a display, the conductive vias may be arranged in a two-dimensional array. Also, the fluid may be aqueous, the exposed surface hydrophobic and the cap members formed of a hydrophilic material.

In another aspect, this invention provides a display comprising:

a substrate;

a first fluid disposed adjacent the substrate, the first fluid absorbing at least one wavelength of light;

a light-transmissive second fluid immiscible with the first fluid; and at least one electrode for applying an electric field to the first fluid, such that, in the absence of an electric field, the first fluid covers a first area of the substrate, but that upon application of an electric field to the first fluid by the at least one electrode, the first fluid moves to a second area smaller than the first area, wherein the first fluid is colored with pigment particles or nanoparticles.

For convenience, this display may hereinafter be called the "pigment/nanoparticle display" of the present invention.

Finally, this invention provides a display comprising:

spaced first and second electrodes, the second electrode being light-transmissive;

first and second fluids confined between the first and second electrodes, the first and second fluids being immiscible with each other, the first and second fluids being non-light-transmissive and having differing colors, the display having a first stable state wherein the first fluid lies adjacent the first electrode so that the color of the second fluid is visible to an observer viewing the display through the second electrode, and a second stable state wherein the first fluid lies adjacent the second electrode so that the color of the first fluid is visible to the observer.

For convenience, this display may hereinafter be called the "dual colored fluid display" of the present invention. In such a display, the first fluid may comprise an oil and the second fluid be aqueous. The display may further comprise first and second dielectric layers disposed between the first and second electrodes respectively and the fluids.

DETAILED DESCRIPTION

As already mentioned, this invention has several different aspects. These various aspects will be described separately below, but it should be understood that a single display may make use of multiple aspects of the invention. For example, a microcell display of the invention might use a first fluid colored with pigment particles or nanoparticles in accordance with the pigment/nanoparticle aspect of the invention.

In the present displays, the first (moving) fluid is typically an oil, while the second fluid is typically aqueous. For ease of comprehension, the description below may use the terms "oil" and "water" instead of first and second fluids, but these terms "oil" and "water" should not be construed in a limitative sense.

Figure 1:
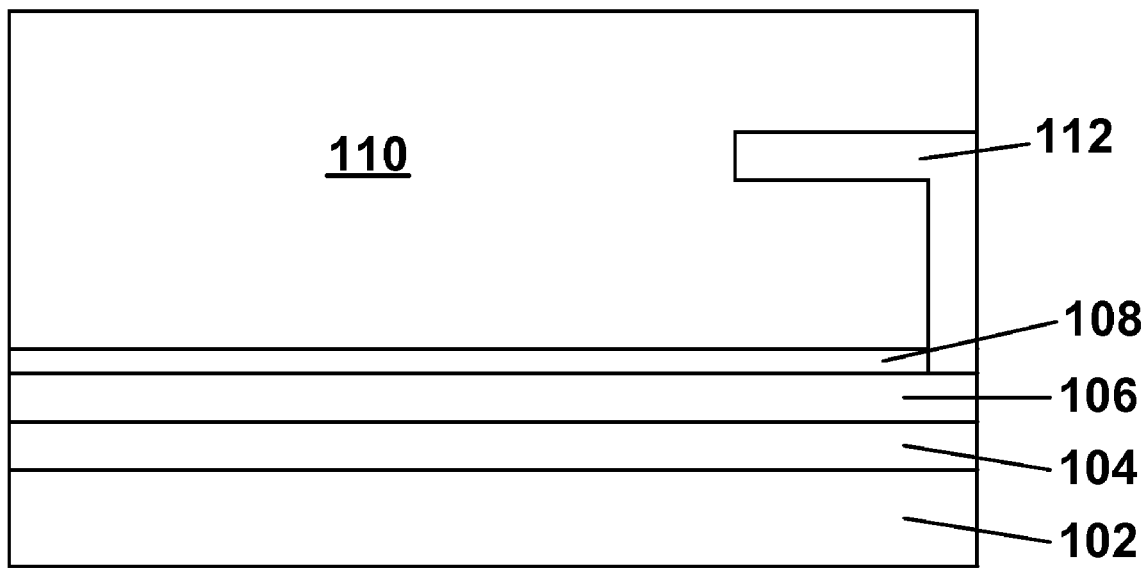
FIG. 1 of the accompanying drawings is a schematic side elevation of a concealment member display of the present invention with the second fluid covering a large first area of a substrate.
Figure 2:
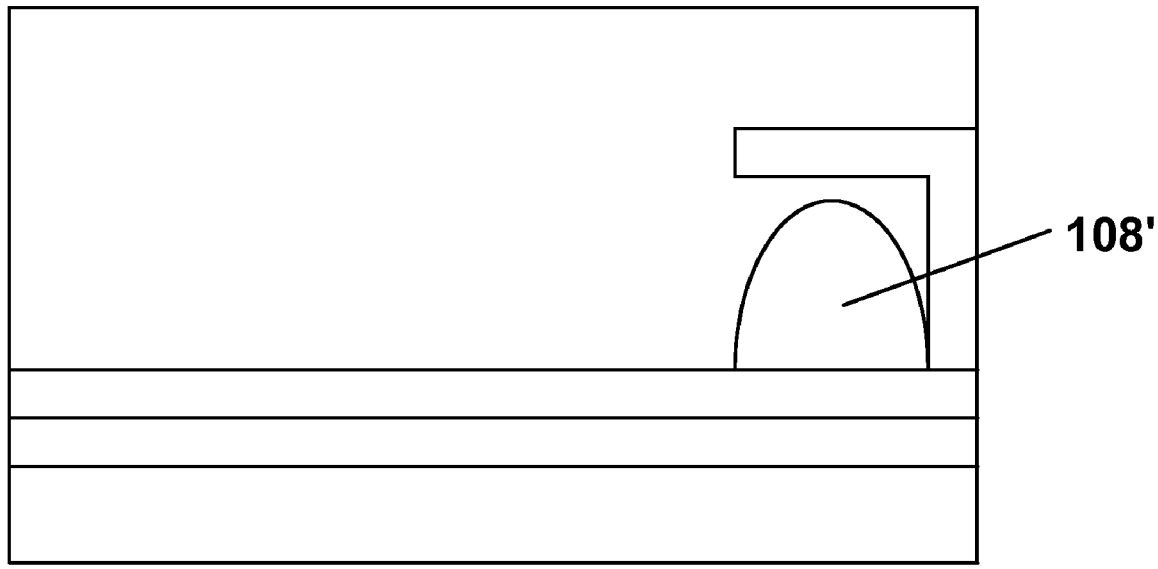
FIG. 2 is a schematic side elevation similar to FIG. 1 but showing the second fluid confined to a smaller second area of the substrate.

Firstly, as already mentioned, the present invention provides a concealment member display having a concealment member for concealing the oil when an electric field is applied; the present invention also provides a method for operating such a display. A specific concealment member display of the invention is illustrated in FIGS. 1 and 2 of the accompanying drawings. As shown in FIG. 1, the electro-wetting display (only a single pixel of which is illustrated) comprises a substrate 102 (typically colored white), a transparent first electrode 104, and a dielectric layer 106. A layer of a colored first fluid (oil) is spread over a large first area (illustrated as the whole) of the dielectric layer 106, and a transparent second fluid (water) 110 overlies the oil layer 108. The electro-wetting display further comprises a concealment member 112 which has a first portion extending away from the dielectric layer 106 and a second portion extending parallel to the planar dielectric layer 106; the surface of the second portion of the concealment member 112 carries a second electrode (not shown).

FIG. 1 shows the electro-wetting display with no field being applied between the two electrodes, so that a colored oil layer 108 is spread uniformly over the surface of the dielectric layer 106. Thus, the single pixel illustrated displays the color of the oil. FIG. 2 shows the display with a field applied between the two electrodes. The oil layer is no longer spread uniformly over the surface of the of the dielectric layer 106 but instead is gathered into the compact droplet 108' covering a second area lying beneath the concealment member 112, so that an observer viewing the display in the intended direction (namely from the opposed side of the concealment member 112 from the substrate 102, i.e., from above in FIGS. 1 and 2) sees primarily the white substrate 102, with the concealment member 112 concealing the oil droplet 108' from the observer.

It will be apparent that the contrast ratio of the pixel can be altered by varying the color of the visible surface of the concealment member 112 (i.e., the surface remote from the dielectric layer 106). For example, making this visible surface white will increase the brightness of the white state of the pixel (as illustrated in FIG. 2) although at some cost to the darkness of the dark state (shown in FIG. 1). Alternatively, the maximum contrast ratio might be achieved by making the visible surface an intermediate gray shade.

Numerous variations of the display shown in FIGS. 1 and 2 are possible. For example, it is not necessary that the second electrode be located on the concealment member, so long as the second electrode is in electrical contact with the water 110. Indeed, it is not necessary that each pixel of the display have a separate second electrode; instead, the display may use an electrode arrangement similar to that of conventional active matrix displays, with a common front electrode (shaped to appropriately direct the movement of the first fluid, as described below) extending across a large number of pixels and typically the whole display) but with individual first electrodes 104 for each pixel. Also, it is not necessary that one optical state of the display show the color of the substrate. For example, the substrate could be transparent, so that the display acts as a light modulator. Alternatively, a colored filter or reflector could be disposed in any suitable location.

Figure 3:
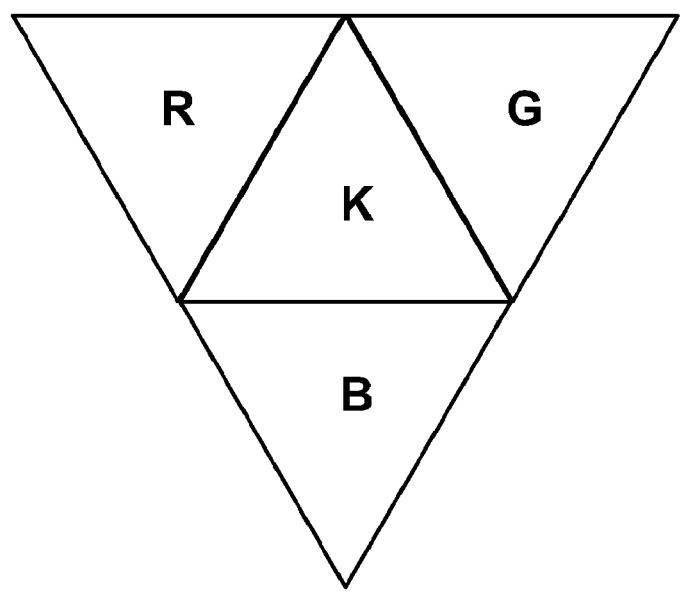
FIG. 3 is a top plan view of the substrate of a four-color color shifting display of the present invention.

FIG. 3 is a highly schematic top plan view of one pixel of the substrate of a four-color color shifting display of the present invention. As will be seen from this Figure, the pixel is equilaterally triangular, and is composed of four equilaterally triangular sub-pixels, with the central sub-pixel being black (K) and the others red (R), green (G) and blue (B); obviously, cyan, yellow and magenta sub-pixels could be used in place of the red, green and blue ones if desired. This pixel is provided with four electrodes (not shown), one at each of the vertices of the triangular pixel and the fourth at its center. (If desired, the electrodes could be provided on concealment members similar to that shown in FIGS. 1 and 2, with the exposed surfaces of the concealment members colored to match the underlying portion of the pixel.) The pixel is used in combination with a black colored oil, and functions in a manner very similar to the display shown in FIGS. 1 and 2. When no field is applied by any of the electrodes, the oil is spread uniformly over the entire pixel, which thus appears black throughout. If a voltage is applied using only the central electrode, the oil is gathered into the central black sub-pixel, leaving the red, green and blue sub-pixels exposed, so that the overall appearance of the pixel will be a "process white" (actually a gray). If, for example, a voltage is applied using both the central electrode and the electrode adjacent the red sub-pixel, the ink will cover the black and red sub-pixels and a cyan color will be displayed. It will readily be apparent that by applying voltages to one, two or three electrodes, a variety of colors can be displayed on the pixel.

Figure 4:
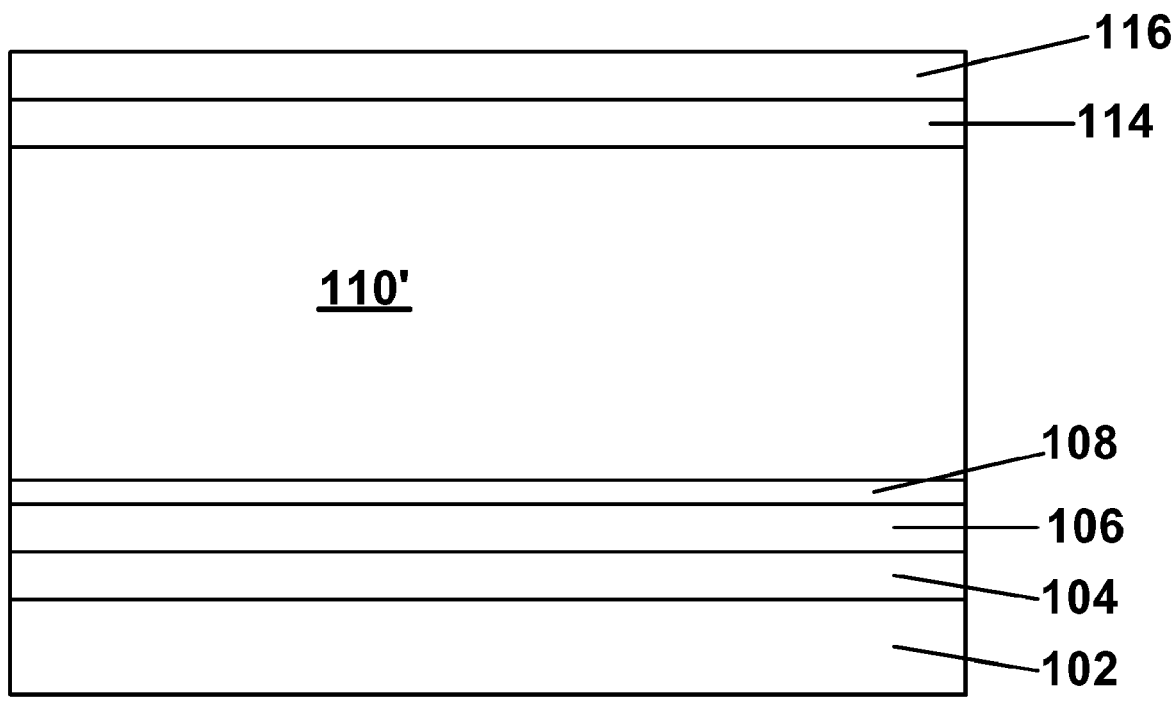
FIG. 4 is a schematic side elevation of a bistable dual colored fluid electro-wetting display of the present invention.

It is also possible to produce bistable electro-wetting displays. Most prior art electro-wetting displays are only monostable because only the state in which no electric field is being applied is stable; the other state (similar to that shown in FIG. 2) only persists as long as the field is applied. However, dual colored fluid electro-wetting displays of the present invention can be made having two states each of which is similar to that shown in FIG. 1. One pixel of one form of such a dual colored fluid bistable display is illustrated in FIG. 4. This display comprises a substrate 102 (which, for reasons explained below, need not be colored), an electrode 104 (which need not be transparent), and a dielectric layer 106, all of which are, except as indicated, similar to the corresponding integers in FIG. 1. The display further comprises a colored oil layer 108 and a colored aqueous layer 110', which has a color different from that of the oil layer 108. There is no concealment member, but instead the display of FIG. 4 comprises a front transparent dielectric layer 114 and a transparent front electrode 116; in practice, it may be desirable to provide a front substrate (not shown) to provide mechanical support and protection for the display.

In the condition shown in FIG. 4, which is equivalent to that shown in FIG. 1, with the oil layer 108 spread uniformly over the dielectric layer 106, the pixel displays (to an observer viewing the display through the electrode 116 and dielectric layer 114, i.e., from above in FIG. 4) the color of the aqueous layer 110', which obscures the color of the oil layer 108. However, by applying suddenly a voltage between the electrode 104 and an electrode (not shown) in contact with the aqueous layer 110', the oil layer 108 can be made to dewet from the dielectric layer 106, form a part-ellipsoidal droplet similar to the droplet 108' shown in FIG. 2, and thence (as the driving voltage is removed) wet the front transparent dielectric layer 114, thereby entering a second stable state, which is generally similar to that shown in FIG. 4 except that the oil layer lies adjacent the front transparent dielectric layer 114. In this second state stable, the pixel displays the color of the oil layer, which obscures the color of the aqueous layer 110'. It will readily be apparent that the pixel can be switched between these two stable states as often as desired. Furthermore, since a substantial voltage will have to be applied to the display to switch it between its two stable states, the display has a threshold for switching; such a threshold may enable such a display to be driven using a passive matrix approach instead of requiring the use of a more complicated active matrix approach.

If dyes are used to color the oil layer 108 and the aqueous layer 110' in the display of FIG. 4, it is important for long term stability of the display that these dyes not migrate between the two layers. In practice, this should not create great difficulties, since a variety of dyes are available which are water-soluble but not oil-soluble, or vice versa. However, it may be advantageous to employ pigment particles or nanoparticles rather than dyes as colorants. Such pigment particles or nanoparticles may be provided with coatings (see, for example, U.S. Published Patent Application No. 2002/0185378) to render them strongly hydrophilic or lipophilic so that they will not migrate between the oil and water layers.

Figure 5:
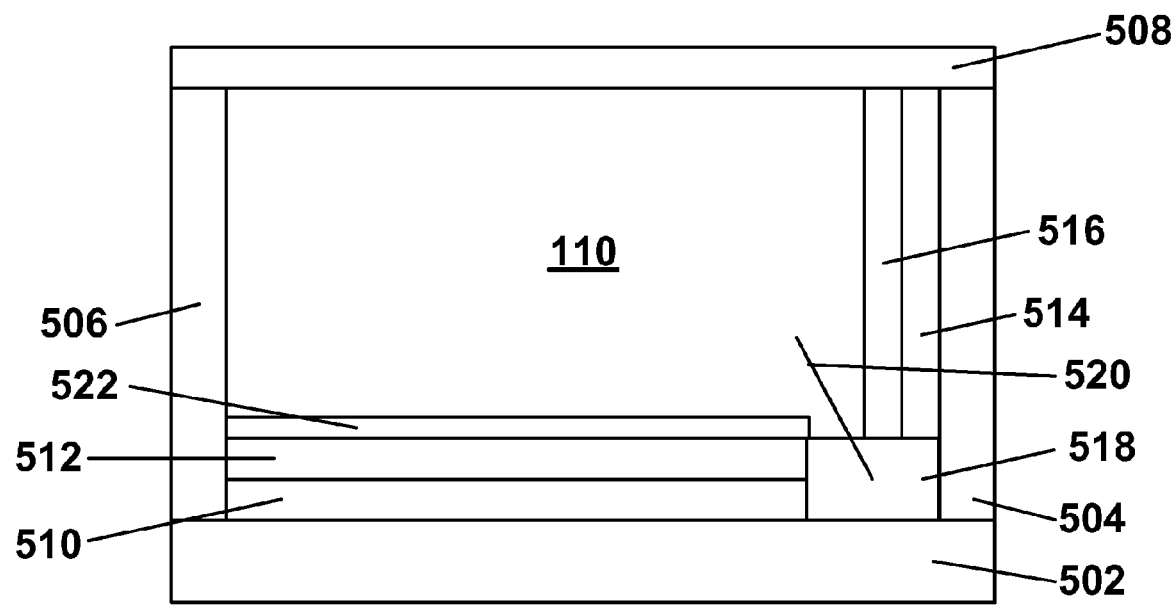
FIG. 5 is schematic side elevation of a microcell display of the present invention.

FIG. 5 of the accompanying drawings is a schematic side elevation, generally similar to that of FIG. 4, and showing a microcell electro-wetting display which operates in a manner generally similar to that of FIG. 4. FIG. 5 shows a single microcell of the display having a rear wall (second substrate) 502, side walls 504 and 506 and a front wall (first substrate) 508 through which the display is viewed. The microcell further comprises a rear transparent electrode 510, and a rear dielectric layer 512, which are similar to the corresponding integers shown in FIGS. 1 and 4 and are disposed adjacent the second substrate surface of the microcell. However, the microcell also comprises a side (second) electrode 514 (which need not be transparent) disposed adjacent the sidewall surface, and an associated side dielectric layer 516. The electrodes 510 and 514 are insulated from each other by an insulator block 518, from which a third electrode 520 emerges into an uncolored aqueous medium 110 which substantially fills the microcell. The microcell also contains a colored oil phase 522.

The first stable state of the microcell shown in FIG. 5 is similar to that of FIGS. 1 and 4; when no voltages are applied between the electrodes, the colored oil phase 522 wets the rear dielectric layer 512 so that an observer viewing the microcell through the front wall 508 sees the color of the oil phase 522 through the uncolored aqueous medium 110. However, upon sudden application of a voltage between the rear electrode 510 and the third electrode 520, the oil phase 522 will cease to wet the rear dielectric layer 512 and will form a droplet which will travel past the electrode 520 and end up in a second stable state in which it wets the side dielectric layer 516. In this second stable state, an observer viewing the microcell through the front wall 508 sees the color (if any) of the rear electrode 510 or the rear dielectric layer 512, either of which may be colored (the oil phase 522 lying adjacent the side dielectric layer 516 occupies only a small proportion of the cross-section of the microcell and is essentially invisible to the observer). Alternatively, both the rear electrode 510 and the rear dielectric layer 512 may be uncolored, and a colored backing or reflector may be provided behind the microcell, so that the microcell can operate in so-called "shutter mode" cf. U.S. Pat. Nos. 6,130,774 and 6,172,798.

It will be appreciated that, in addition to the embodiments described above with reference to FIGS. 1 to 5, numerous other types of color electro-wetting displays can be produced using colored oil phases which are moved to cover electrodes having other colors and possibly differing in area. It is known that liquid droplets can be moved by electric fields between adjacent electrodes lying in the same plane by applying voltage to an electrode adjacent to one on which an oil phase is resting, thereby causing the oil phase to move to the electrode to which the voltage is applied. Such movement can of course be reversed. By using electrodes differing in color and optionally size, and colored oil phases, a variety of effects can be produced. A simple monochrome display can be provided by moving a black oil phase between a large white electrode and a small black one; obviously, when the black oil phase covers the white electrode, both the black and white electrodes appear black, while when the black oil phase is confined to the small black electrode, the overall appearance of the pixel is essentially white. More complex effects, including color, can be produced by using (for example) an oil phase having substantially the same color as a small electrode, while an adjacent larger electrode is of a complementary color. Thus, a color display might make use of individual pixels having the following oil/electrode combinations:

red oil/small red electrode/large cyan electrode;
green oil/small green electrode/large magenta electrode; and
blue oil/small blue electrode/large yellow electrode.

Figure 6:
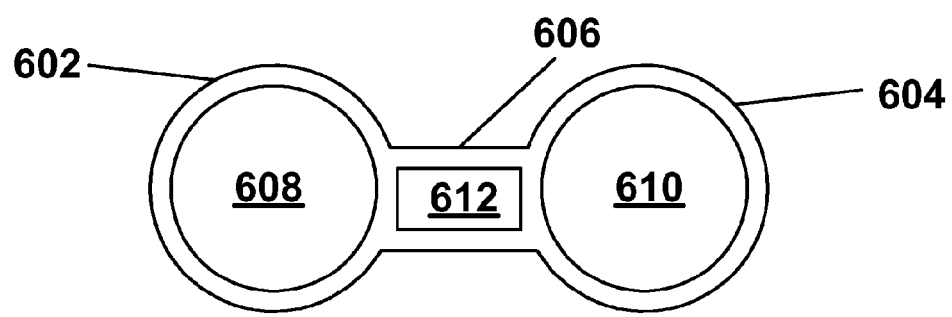
FIG. 6 is a top plan view of a second color shifting display of the present invention.

In such displays, the second color shifting display of the present invention shown in FIG. 6 may be useful. This display is essentially dumb-bell shaped, with a dielectric surface having two circular portions 602 and 604 linked by a central, substantially rectangular "neck" portion 606. There are three independently controllable electrodes, namely two circular electrodes 608 and 610 located in the centers of the circular portions 602 and 604 respectively, and a rectangular electrode 612 located in the center of the neck portion 606.

The display shown in FIG. 6 operates in the following manner. Suppose a colored oil phase is disposed on the circular portion 602, with an aqueous phase overlying the colored oil phase and extending into contact with the rectangular electrode 612 and the circular portion 604. If it is desired to move the oil phase to occupy the circular portion 604, a voltage is applied to the electrode 608, thereby making this electrode hydrophilic, and no voltage is applied to the electrode 612, so that this electrode becomes hydrophobic. Accordingly, the oil phase moves from portion 602 to neck portion 606. Next, a voltage is applied to electrode 612, while keeping the voltage applied to electrode 608, but no voltage is applied to the electrode 610. Accordingly, the oil phase moves from neck portion 606 to circular portion 604. The disposition of the oil phase on circular portion 604 will typically be stable, so that once the oil phase is located on portion 604, no voltage need be applied to any of the electrodes.

Although the circular portions 602 and 604 are shown as the same size in FIG. 6, these portions could of course vary in shape (for example, one portion could be elliptical rather than circular), size and/or color. In addition, one of the circular portions could be provided with a concealment member, similar to concealment member 112 in FIG. 1, to obscure the oil phase present on that circular portion.

Figure 7:
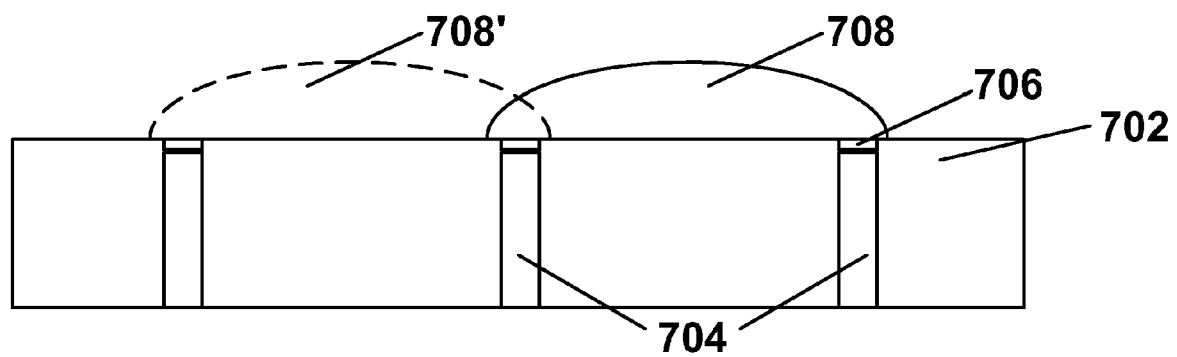
FIG. 7 is a schematic side elevation of a conductive via display of the present invention.

FIG. 7 is a schematic side elevation of a conductive via electro-wetting display of the present invention. This display uses an aqueous (and typically colored) medium as its working fluid. The display of FIG. 7 comprises a substrate 702 formed of a hydrophobic dielectric material. A very high K dielectric is preferred for this purpose, for example a suspension of a ceramic high K dielectric such as barium titanate in a polar polymer such as poly(vinylidene fluoride). For reasons which will appear below, provided that the entire substrate 702 is insulating, only the properties of the exposed upper surface (as illustrated in FIG. 7) of the substrate 702 affect the operation of the display. Thus, the substrate 702 could comprise a high K hydrophobic dielectric exposed surface layer on a base of a low K material, for example a polymer such as polyethylene or poly(ethylene terephthalate).

A plurality of spaced conductive vias 704 extend through the substrate 702, and terminate adjacent the exposed upper surface thereof. Each via 704 is capped by a thin cap member 706 in the form of a hydrophilic coating covering the end of the conductive via 704 adjacent the exposed upper surface of the substrate 702. Although only three vias 704 arranged in a line are shown in FIG. 7, in practice a larger number would typically be used, and the vias would be arranged in a two-dimensional array.

An aqueous working fluid, illustrated as a drop 708, rests upon the exposed surface of the substrate 702. In the absence of any voltage on any of the vias 704, the drop 708 will not wet the hydrophobic surface of the substrate 702, but will "ball up" around the cap member 706 of one of the vias 704 (this is not the situation illustrated in FIG. 7). However, by applying voltage to two adjacent vias 704 (say the center and right vias in FIG. 7), the portion of the surface of the substrate 702 between these vias becomes less hydrophobic, and consequently the drop 708 spreads out across the cap members of the two vias to which the voltage has been applied, and the intervening portion of the substrate 702, as illustrated in FIG. 7. Provided the characteristics of the cap members 706 and the exposed surface of the substrate 702 are chosen appropriately, the drop 708 will be stable in the position shown in FIG. 7, i.e., the drop will remain in the same position even after removal of voltage from the two electrodes, since the drop is "pinned" at either end by the cap members 706 on the two vias.

To move the drop 708 to a different position, a voltage may be applied to (say) the center and left vias 704. This renders the portion of the exposed surface of the substrate 702 between these vias less hydrophobic, and consequently the drop will flow on to the less hydrophobic portion of the surface, thus assuming the form 708' shown in FIG. 7. Obviously, more elaborate manipulations of the aqueous fluid are possible, especially using two-dimensional arrays of vias.

As already indicated, this invention also extends to the use of pigments and nanoparticles as coloring agents in electro-wetting displays. Although electro-wetting displays have hitherto used dyes dissolved in the oil and/or aqueous phases, dyes in solution are notoriously susceptible to the long term effects of electromagnetic radiation, especially ultra-violet radiation, which tends to cause fading and/or discoloration of the dyes, and such effects may limit the operating lifetime of electro-wetting displays. Replacement of dissolved dyes with pigments or nanoparticles provides useful increases in the operating lifetime. The use of pigments or nanoparticles also allows for control of the surface properties of the pigments or nanoparticles, for example, by the formation of charged or chargeable groups, or polymers, thereon (see, for example, U.S. Published Patent Application No. 2002/0185378).

Numerous changes and modifications can be made in the preferred embodiments of the present invention already described without departing from the spirit and scope of the invention. Accordingly, the whole of the foregoing description is to be construed in an illustrative and not in a limitative sense.

What is claimed is:

1. A display comprising:
    a substrate;
    a first fluid disposed adjacent the substrate, the first fluid absorbing at least one wavelength of light;
    a light-transmissive second fluid immiscible with the first fluid;
    at least one electrode for applying an electric field to the first fluid; and
    a concealment member spaced from the substrate and formed from a substantially opaque material,
    such that, in the absence of an electric field, the first fluid covers a first area of the substrate, but that upon application of an electric field to the first fluid by the at least one electrode, the first fluid moves to a second area smaller than the first area and substantially confined between the concealment member and the substrate, so that the concealment member substantially conceals the first fluid from an observer viewing the display from the opposed side of the concealment member from the substrate.

2. A display according to claim 1 wherein the substrate comprises a dielectric surface layer adjacent the first fluid.

3. A display according to claim 1 wherein the substrate comprises a colored or reflective layer.

4. A display according to claim 1 wherein the substrate has a substantially planar surface and the concealment member includes a substantially planar section extending substantially parallel to, but spaced from, the substantially planar surface of the substrate.

5. A display comprising:
- a substrate having at least first and second portions having first and second optical characteristics differing from one another;
- a first fluid, the first fluid absorbing at least one wavelength of light and having a third optical characteristic differing from at least one of the first and second optical characteristics;
- a light-transmissive second fluid immiscible with the first fluid; and
- a first electrode adjacent the first portion of the substrate and a second electrode adjacent the second portion of the substrate,
- such that by controlling the potentials applied to the first and second electrodes, the first fluid can be made to assume a first position, wherein the first fluid substantially covers the second portion of the substrate, leaving the first portion uncovered, and a second position, wherein the first fluid substantially covers the first portion of the substrate, leaving the second portion uncovered.

6. A display according to claim 5 wherein the first fluid can be made to assume a third position wherein it covers both the first and second portions of the substrate.

7. A display according to claim 5 wherein the substrate has a third portion having an optical characteristic differing from the first, second and third optical characteristics, the display further comprising a third electrode adjacent the third portion of the substrate, such that by controlling the potentials applied to the first, second and third electrodes, the first fluid can be made to assume a third position, wherein the first fluid substantially covers at least one of the first and second portions of the substrate, leaving the third portion uncovered.

8. A display according to claim 7 wherein the first, second and third portions of the substrate comprise a red portion, a green portion and a blue portion, or a yellow portion, a cyan portion and a magenta portion.

9. A display according to claim 7 wherein the substrate has a fourth portion having an optical characteristic differing from the first, second and third optical characteristics and from the optical characteristic of the third portion of the substrate, the display further comprising a fourth electrode adjacent the fourth portion of the substrate, such that by controlling the potentials applied to the first, second, third and fourth electrodes, the first fluid can be made to assume a fourth position, wherein the first fluid substantially covers at least one of the first, second and third portions of the substrate, leaving the fourth portion uncovered.

10. A display according to claim 9 wherein the first, second, third and fourth portions of the substrate comprise a red portion, a green portion, a blue portion, and a black portion, or a yellow portion, a cyan portion, a magenta portion and a black portion.

11. A display according to claim 5 wherein the first and second portions of the substrate are coplanar.

12. A display according to claim 5 wherein the first and second portions of the substrate have substantially the form of equilateral triangles.

13. A display according to claim 5 wherein the first and second portions of the substrate have substantially the form of circles, the substantially circular first and second portions being connected by a neck section having a width smaller than the diameter of each substantially circular portion.

14. A display according to claim 13 wherein an electrode is disposed on or adjacent the neck section.

15. A display comprising:
- a first substrate through which an observer can view the display, a second substrate spaced from the first substrate and at least one sidewall extending between the first and second substrates, the first and second substrates and the sidewall together defining a chamber having a first substrate surface, a second substrate surface and at least one sidewall surface;
- a first fluid disposed within the chamber, the first fluid absorbing at least one wavelength of light;
- a light-transmissive second fluid immiscible with the first fluid and disposed within the chamber;
- a first electrode disposed adjacent the second substrate surface of the chamber;
- a second electrode disposed adjacent a sidewall surface of the chamber; and
- a third electrode extending into the chamber and in electrical contact with the second fluid,
- such that, by controlling the potentials applied to the first, second and third electrodes, the first fluid can be made to assume a first position, wherein the first fluid lies adjacent the second substrate surface of the chamber, and a second position, wherein the first fluid lies adjacent a sidewall surface of the chamber.

16. A display according to claim 15 wherein the second substrate comprises a dielectric surface layer adjacent the first fluid.

17. A display according to claim 15 wherein the second substrate comprises a colored or reflective layer.

18. A display according to claim 15 further comprising an insulator block disposed adjacent the junction between the second substrate surface and a sidewall surface of the chamber, wherein the third electrode passes through the insulator block.

19. A display comprising:
- a fluid;
- a substrate having an exposed surface resistant to wetting by the fluid;
- at least three conductive vias extending through the substrate and terminating adjacent the exposed surface thereof; and
- cap members covering the ends of the conductive vias adjacent the exposed surface, the cap members being formed of a material wetted by the fluid.

20. A display according to claim 19 wherein the conductive vias are arranged in a two-dimensional array.

21. A display according to claim 19 wherein the fluid is aqueous, the exposed surface is hydrophobic and the cap members are formed of a hydrophilic material.

22. A display comprising:
- a substrate;
- a first fluid disposed adjacent the substrate, the first fluid absorbing at least one wavelength of light;
- a light-transmissive second fluid immiscible with the first fluid; and
- at least one electrode for applying an electric field to the first fluid,
- such that, in the absence of an electric field, the first fluid covers a first area of the substrate, but that upon application of an electric field to the first fluid by the at least one electrode, the first fluid moves to a second area smaller than the first area,
- wherein the first fluid is colored with pigment particles or nanoparticles.

23. A display comprising:
- spaced first and second electrodes, the second electrode being light-transmissive;

first and second fluids confined between the first and second electrodes, the first and second fluids being immiscible with each other, the first and second fluids being non-light-transmissive and having differing colors, the display having a first stable state wherein the first fluid lies adjacent the first electrode so that the color of the second fluid is visible to an observer viewing the display through the second electrode, and a second stable state wherein the first fluid lies adjacent the second electrode so that the color of the first fluid is visible to the observer.

24. A display according to claim 23 wherein the first fluid comprises an oil and the second fluid is aqueous.

25. A display according to claim 24 further comprising first and second dielectric layers disposed between the first and second electrodes respectively and the fluids.

* * * * *